Figure 1:
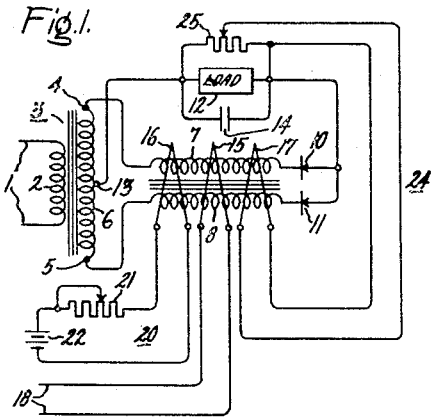

Inventors:
Martin A. Edwards,
Charles F. Bauersfeld,
by
Their Attorney.

Patented June 20, 1950

2,512,317

UNITED STATES PATENT OFFICE 2,512,317

EXCITATION CONTROL SYSTEM

Martin A. Edwards, Scotia, and Charles F. Bauersfeld, Schenectady, N. Y., assignors to General Electric Company, a corporation of New York Application January 24, 1949, Serial No. 72,482

4 Claims. (Cl. 318—432)

Our invention relates to current regulating circuits for electric power systems. More particularly, it relates to automatic excitation control circuits for electric motors in electric power systems of the type having a suitable source of driving energy, such as a prime mover or an electric motor, rotating electrical generator coupled mechanically to the driving device, and a motor component coupled electrically to the generator and mechanically to a suitable load.

Power systems of the type described are frequently applied to Diesel-electric locomotives and the like. In applications of this type, when the prime mover is an engine of the internal combustion type, such as a Diesel engine, it is desirable to protect the engine from overload conditions by limiting the output of the engine to a safe value with respect to the design of the engine. Devices well known in the art and outside the scope of the present invention may be provided to limit the output power which may be taken from the engine by a loading generator. If the driving device, on the other hand, is an electric motor, energized from an electrical bus, it is again desirable to place limitations by methods well known in the art, on the amount of power which may be taken from the motor. Hence, regardless of the form of the source of driving energy which may be provided in an electric power system of the type described, a limitation exists in the amount of power which is safely or economically available from said driving device.

In the conversion of mechanical power from a driving device into electrical power by use of an electrical generator, it is well known that such power may be made available and utilized at various voltage and current levels, the product of these two quantities representing approximately the power delivered by the generator. Unless provision is made to regulate the current supplied by the generator to a load, such as a motor, it is entirely possible to overload the driving device. Furthermore, if extremes of current, either relatively small or large values, are permitted to be drawn, the products of such currents and their corresponding voltage values, which represent approximately the power output of the generator, will be relatively small with respect to the power available from the driving device, and it may be said that the degree of utilization of such power is relatively poor.

In general, it is desirable to utilize power from the generator at the maximum voltage available from the generator at the particular speed at which it is operated to effect economy through reduced losses and to obtain the highest utility of a loading device, such as a motor. Hence it is desirable to load the generator, if possible, consistently at the point where the power output of the generator, represented approximately by the product of generator voltage and current, corresponds to the safe power available from the driving device. This point may be termed the point of maximum utilization of the generator and its driving device.

In our invention we provide an apparatus for regulating the current drawn from a generator in such a manner as to operate an electric power system at the point of maximum utilization. Our apparatus as herein embodied controls current in an electric power system by shunting the field exciting winding of the motor component to cause the load current drawn by the motor automatically to remain substantially constant within a relatively narrow band. Our apparatus additionally accomplishes this result in a plurality of relatively small steps rather than in one large and therefore relatively discontinuous step.

Accordingly, it is an object of our invention to provide a new and improved apparatus for regulating the current in an electric power system.

It is another object of our invention to provide a new and improved automatic excitation control circuit for the motor component of an electric power system.

It is a further object of our invention to provide a new and improved apparatus for operating an electric power system at a point of maximum utilization with respect to the driving and generating devices.

In accordance with the illustrated embodiment of our invention, we provide magnetic devices for amplifying a relatively small signal representing the current in an electric power system, the outputs of said magnetic amplifying devices being utilized in electrical relays to control a motor-operated rheostatic device connected in shunt relation with the series field of the motor component of the power system.

Figure 2:
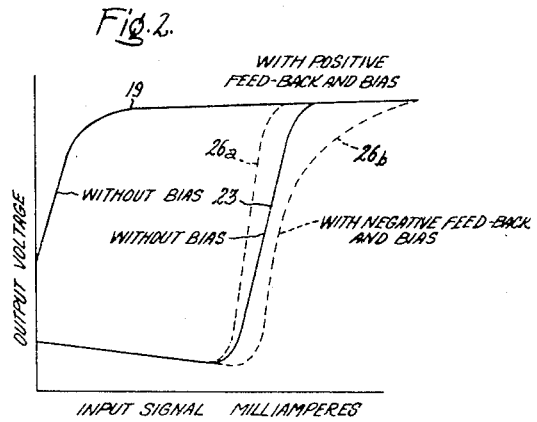
Figure 3:
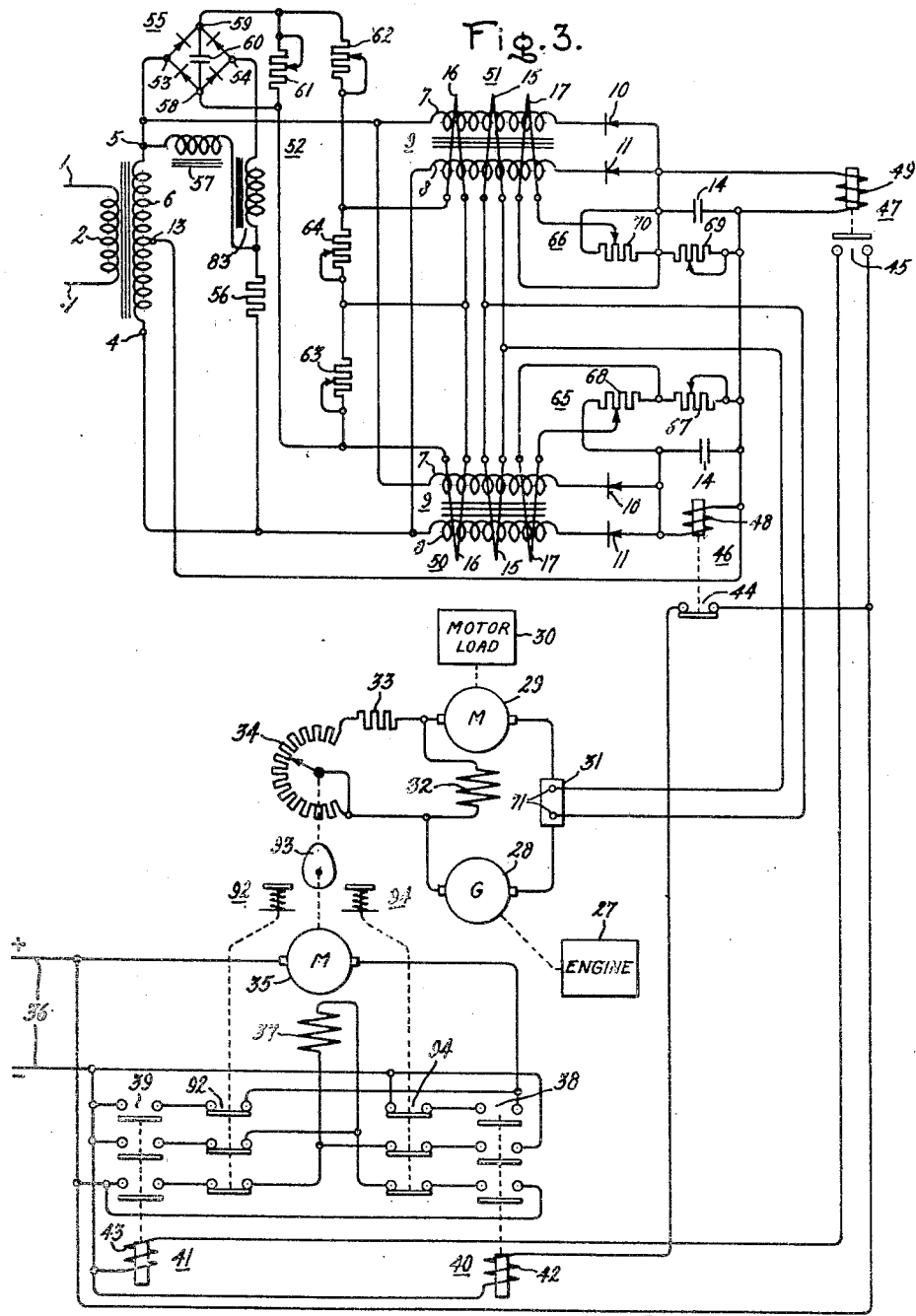

For a better understanding of our invention, attention is now directed to the following description taken in connection with the figures of the accompanying drawing. Fig. 1 represents a bi-phase magnetic amplifier; Fig. 2 represents certain operating characteristics of the amplifier arrangement shown in Fig. 1; Fig. 3 represents an electric power system together with a control circuit to accomplish automatic excitation control as previously described; and Figs. 4, 5, 5a and 6 represent certain operating characteristics of the arrangement shown in Fig. 3.

Referring now to Fig. 1 of the accompanying drawing, there is shown a bi-phase magnetic amplifier, the description of which will assist in understanding our invention. The function of such an amplifier is to deliver an output voltage across a load impedance, which may be the magnetic coil of an electric relay, the output voltage being substantially increased in magnitude with respect to a relatively small input signal. Energy for the amplifier is obtained from an alternating current source 1 across which is connected the primary winding 2 of a transformer 3. The terminal points 4 and 5 of secondary winding 6 of transformer 3 are connected to separate windings 7 and 8 of a saturable reactor device 9. The opposite terminals of windings 7 and 8 are connected to rectifying devices 10 and 11 which are preferably of the dry-plate type. Rectifying devices 10 and 11 are in turn connected to one terminal of a load device 12, the other terminal of which is connected to the center tap 13 of transformer winding 4. A capacitor 14 is connected in shunt relation across the terminals of load 12 for the purpose of dampening the ripple component of the voltage impressed on load 12. Saturable reactor 9 is provided with a plurality of signal windings such as windings 15, 16 and 17. A signal to be amplified is impressed across terminals 18 of signal winding 15.

Referring to Fig. 2, with the arrangement as thus far described, if a signal is impressed across terminals 18 of signal winding 15, an output voltage as represented by curve 19 is impressed across the terminals of load 12. It will be noted that the useful range of the amplifier is considerably limited, since a relatively large output voltage is impressed across load 12 when the input signal across terminals 18 is zero. If a suitable bias is applied to the system, the useful range of the magnetic amplifier may be increased. Biasing may be accomplished by use of a bias circuit 20 comprising a bias signal winding 16 of saturable reactor 9, an adjustable resistor 21, and a suitable source of biasing potential such as a battery 22. With the addition of a bias circuit, the characteristic of the amplifier is as represented by curve 23 of Fig. 2. The operating characteristic of the amplifier may be further modified, frequently to advantage by the use of either positive or negative feedback in the system. Use of positive feedback tends to increase the sensitivity of the amplifier, as represented by characteristic 26a of Fig. 2, while use of negative feedback tends to increase the stability of the amplifier, as represented by characteristic 26b of Fig. 2. Introduction of feedback may be accomplished by use of a feed-back circuit 24 comprising a feed-back signal winding 17 of saturable reactor 9 and a voltage dividing resistor 25 connected in shunt relation with load 12.

In Fig. 3 of the accompanying drawing there is represented an embodiment of our invention as applied to an electric power system which may be of the type used in connection with self-propelled traction vehicles. The electric power system comprises a source of generator driving power 27 which is represented as an internal combustion engine, an electrical generator 28 coupled mechanically to driving source 27, and an electric motor 29 having an armature winding and a series field exciting winding 32 connected across the terminals of generator 28. While we show only a single such motor in order to simplify the drawings and explanations, it is well known that a plurality of such motors and their associated control circuits may be and usually is employed in a system of the type to be described. Motor 29 is suitably coupled to a load 30, which may be, for example, the gearing and traction wheels of a self-propelled traction vehicle. A shunt 31 is connected in series with generator 28 and motor 29 for the purpose of measuring the current supplied by generator 28 and utilized by motor 29. In parallel relation with series field 32 of the motor 29 is connected a field-shunting circuit comprising a fixed resistance 33 and a variable resistance 34, the latter being adjusted mechanically by means of a reversible electric motor 35. Energy for electric motor 35 is supplied by direct current source 36. Energy is supplied to motor 35 through relay contacts 38 or 39 of electrical relays 40 and 41 to cause either forward or reverse rotation of motor 35.

Magnetic coils 42 and 43 of relays 40 and 41 are supplied with energy from direct current source 36 to close, respectively, relay contacts 38 and 39. However, the flow of energy from direct current source 36 to magnetic coils 42 and 43 is controlled by contacts 44 and 45, respectively, of a pair of relays 46 and 47. Magnetic coils 48 and 49 of relays 46 and 47 comprise the principal load impedances of a pair of magnetic amplifier circuits 50 and 51 of the type previously described and diagrammatically represented in Fig. 1. Energy for magnetic amplifiers 50 and 51 is obtained from an alternating current source 1 across which is connected the primary winding 2 of a transformer 3. The terminals of windings 7 and 8 of a pair of saturable reactor devices 9 are connected to terminals 4 and 5, respectively, of secondary winding 6 of transformer 3. The opposite ends of windings 7 and 8 are connected respectively to like terminals of a pair of rectifier devices 10 and 11 which are preferably of the dry-plate type. The opposite terminals of rectifiers 10 and 11 are connected together and, in turn, the common terminals of rectifiers 10 and 11 of magnetic amplifier 50 are connected to one terminal of magnetic coil 48 of relay 46 and, similarly, the common terminals of rectifiers 10 and 11 of magnetic amplifier 51 are connected to one terminal of magnetic coil 49 of relay 47. The opposite terminals of coils 48 and 49 are connected to center-tap 13 of secondary winding 6 of transformer 3. A capacitor 14 is connected across each of the magnetic coils 48 and 49 for the purpose of dampening the ripple component of the voltages impressed across coils 48 and 49.

Biasing is supplied to magnetic amplifiers 50 and 51 by means of a bias circuit 52. Use is made of secondary winding 6 of the transformer 3 to supply alternating current energy to a full-wave rectifying device 55, preferably of the dry-plate type. Compensation for the effect of variations in the magnitude of the voltage of the alternating current source 1 is provided by use of a voltage-dropping resistor 56 and a saturable reactor 57 connected in series across terminals 4 and 5 of secondary winding 6. Terminals 53 and 54 of rectifier 55 are connected in series with a linear reactor 83 across point 5 of transformer winding 6 and the common terminal of saturable reactor 57 and resistor 56. Compensation for the effect of frequency variations in alternating current source 1 is provided by the use of linear reactor 53. The direct current voltage for bias circuit 52 appears across terminals 58 and 59 of rectifier 55. A capacitor 60 is connected across terminals 58 and 59 of rectifier 55 for the purpose of dampening the ripple component of the direct current voltage across terminals 58 and 59. Bias circuit 55 comprises further an adjustable resistor 61 connected across terminals 58 and 59 of rectifier 55 and a series combination comprising resistors 62, 63 and 64 also connected across terminals 58 and 59 of rectifier 55. Bias winding 16 of magnetic amplifier 50 is connected across adjustable resistor 63, and bias winding 16 of magnetic amplifier 51 is connected across adjustable resistor 64.

Feedback is supplied to magnetic amplifiers 50 and 51 by use of a pair of feed-back circuits 65 and 66. Feed-back circuit 65 comprises an adjustable resistor 67 and fixed resistor 68 connected in series across magnetic coil 48, and a feed-back winding 17 of saturable reactor 9 connected across a portion of resistor 68. Similarly, feed-back circuit 66 comprises adjustable resistor 69 and fixed resistor 70 connected in series across magnetic coil 49, and a feed-back winding 17 of saturable reactor 9 connected across a portion of resistor 70.

The main signal windings 15 of saturable reactors 9 are connected in parallel relation across the measuring terminals 71 of shunt 31 in the circuit of generator 28 and motor 29.

Figure 4:
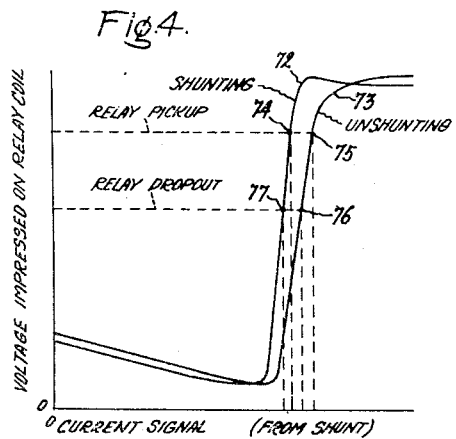

To assist in the understanding of the operation of the automatic regulating system as diagrammatically represented in Fig. 3, consideration will first be given to that portion of the system comprising magnetic amplifiers 50 and 51, including alternating current source 1, bias circuit 52, feedback circuits 65 and 66. Let it be assumed that a current is flowing in shunt 31 and that therefore a signal voltage of relatively small magnitude exists across terminals 71 of shunt 31. Curve 72 of Fig. 4 represents the operating characteristic of magnetic amplifier 50, the action of which is to effect "shunting" of series field 32 of motor 29 as will be subsequently explained. Curve 73 of Fig. 4 represents the operating characteristic of magnetic amplifier 51, the action of which is to effect "unshunting" of motor field 32. As the signal voltage across shunt terminals 71 increases in magnitude due to an increase in current through shunt 31, the voltages impressed across the load impedances of magnetic amplifiers 50 and 51, in particular magnetic relay coils 48 and 49, follow characteristic curves 72 and 73, respectively, of Fig. 4.

As the current signal is increased to a value corresponding to point 74 on curve 72, pickup or closing of relay 46 of magnetic amplifier 50 occurs. As the current signal is increased to a value corresponding to point 75 on curve 73, pickup of relay 47 of magnetic amplifier 51 occurs. Further increase in the current signal results in no further action of the relays 46 and 47. Decrease in the current signal results in action of an opposite sense, namely dropout or opening of relay 47 at a signal value corresponding to point 76 of curve 73, and dropout of relay 46 at point 77 on curve 72. Further decrease in the current signal results in no further action of relays 46 and 47. Adjustment of bias-adjusting resistors 61 and 62 serves to shift both characteristic curves 72 and 73 of Fig. 4 to the left or right together, thereby decreasing or increasing the values of current signal at which relays 46 and 47 operate. Adjustment of bias-adjusting resistor 63 causes the characteristic curve 72 to shift to the left or right, thereby causing a decrease or increase in the values of current at which relay 46 operates. Similarly, adjustment of resistor 64 causes a decrease or increase in the values of current at which relay 47 operates.

Figure 5:
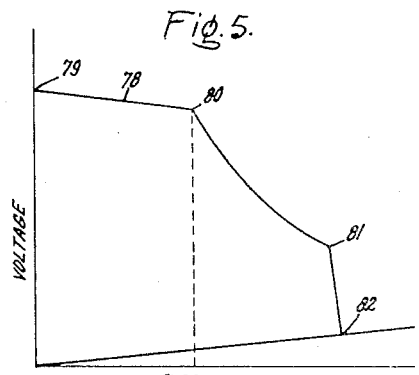
Figure 5A:
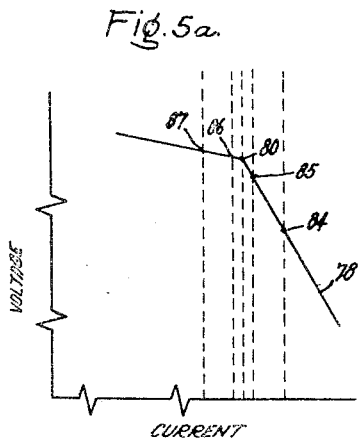

Attention is now directed to Fig. 5, in which curve 78 represents the volt-ampere characteristic of generator 28 as driven at a particular constant speed by engine 27. The portion of curve 78 lying between points 79 and 80 represents the voltage limitation of generator 28, while the portion of curve 78 lying between points 81 and 82 represents the current limitation of generator 28. The portion of curve 78 lying between points 80 and 81 represents the power output limitation of engine 27 imposed on the system by load-limiting devices customarily used with such engines. As previously described, point 80 represents the point of maximum utilization of engine 27 and generator 28, and it is desirable to operate the system as close to this point as possible. Fig. 5a represents an enlargement of the region of characteristic 78 in the immediate vicinity of point 80. In Fig. 5a, point 84 represents the current value corresponding to the value of the current signal at point 75 shown in Fig. 4. Similarly, point 85 corresponds to point 76 of Fig. 4, point 86 corresponds to point 74 of Fig. 4, and point 87 corresponds to point 77 of Fig. 4. Thus, pickup and dropout of relay 47 occur at current values corresponding to points 84 and 85, respectively, of Fig. 5a; similarly, pickup and dropout of relay 46 occur at current values corresponding to points 86 and 87, respectively, of Fig. 5a. The actual current values at which pickup and dropout of relays 46 and 47 occur are controlled by adjustment of resistors 61, 62, 63 and 64 as previously explained.

Figure 6:
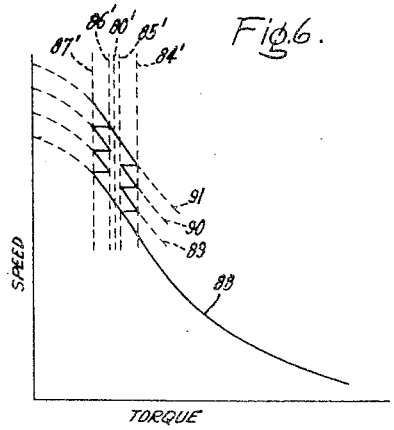

Fig. 6 represents an operating characteristic of motor 29 in which motor speed is plotted against motor torque for a number of field shunting conditions. In particular, curve 88 represents a condition of minimum shunting of series field 32. In other words, variable shunting resistor 34 is adjusted to its maximum resistance. Curves 89, 90 and 91 represent conditions of increasing amounts of shunting, curve 91 representing the condition of maximum shunting, which occurs when resistor 34 is adjusted to its minimum value. The torque values in Fig. 6 correspond to current values on curve 78 in Fig. 5a and are given prime numerals which correspond to numerals used for current values in Fig. 5a. In describing the sequence of operation of the automatic field shunting system of our invention, it will be assumed that motor 29 is accelerating load 30 and that initially the motor current is in excess of value 84 of Fig. 5a. Under this condition, relays 46 and 47 of Fig. 3 are both closed. Since contacts 44 of relay 46 are of the normally closed type, when relay 46 is closed contacts 44 are open and relay 40 and contacts 38 are also open. Since contacts 45 of relay 47 are of the normally open type, when relay 47 is closed contacts 45 are also closed completing the circuit of relay 41 causing contacts 39 to be closed. Motor 35 is thus energized from direct current source 36 causing rotation of motor 35 and adjustment of resistor 34.

Rotation of motor 35 and adjustment of resistor 34 continue until the circuit of motor 35 is interrupted at the limit of adjustment of resistor 34 by a suitable travel-limiting device, such as a limit switch 92 actuated by a cam 93 driven by motor 35. At this point, resistor 34 is adjusted to its maximum value causing a condition of minimum shunting of field 32. Under this condition, operation of motor 29 is represented by curve 88 of Fig. 6. As load 30 is accelerated by motor 29, motor current and torque decrease to a value corresponding to point 85' on curve 88, at which point relay 47 opens, causing relay 41 and contacts 39 also to open. Since motor 35 has previously been stopped by travel-limiting device 92, opening of contacts 39 does not affect operation of motor 35. The current of motor 29 continues to decrease with an accompanying decrease in torque and eventually reaches a value corresponding to point 87' on curve 88. At this point, relay 46 opens causing contacts 44 to close, completing the circuit of relay 40, and causing contacts 38 to be closed energizing motor 35 from direct current source 36. However, field 37 is energized oppositely to its previous condition of energization, and therefore motor 35 rotates oppositely to its previous direction of rotation. Resistor 34 is therefore adjusted so that the amount of shunting of series field 32 is increased. As field 32 is shunted, the counterelectromotive force developed by motor 29 is reduced and the motor current is temporarily increased. Motor operation is now represented by curve 89 of Fig. 6. As motor current and torque increase to point 86' on curve 89, relay 46 is closed, causing rotation of motor 35 and adjustment of resistor 34 to be stopped. As motor 29 continues to accelerate load 30, the motor current and torque decrease along curve 89 until point 87' is again reached. At this point, relay 46 will again open, causing motor 35 to resume rotation and further reduce resistance 34 to provide additional shunting of field 32. The motor current and torque are again temporarily increased, and operation of motor 29 is represented by curve 90 of Fig. 6. The process described, comprising opening and closing of relay 46 at predetermined current values 87 and 86, corresponding to motor torques 87' and 86', to effect adjustment of resistance 34, continues in a plurality of relatively small steps as the current varies from value 87 to value 86 on Fig. 5a, until the condition of maximum shunting is achieved as represented by the minimum adjustment of resistance 34. At this point, further rotation of motor 35 and adjustment of resistor 34 are prevented by a suitable travel-limiting device such as a limit switch 94 actuated by cam 93 and arranged to interrupt the circuit of motor 35. Operation of motor 29 under these conditions is represented by curve 91 of Fig. 6. It is now assumed that motor 29 is operating on characteristic curve 91 in a condition of maximum field shunting and that an increase in load 30 takes place, accompanied by a corresponding increase in the current of motor 29. As motor current and torque increase to point 84' on curve 91, relay 47 is closed, causing reverse rotation of motor 35 to occur, with an accompanying reduction in the amount of shunting of field 32 by increase of resistance 34. The motor current and torque are temporarily reduced to point 85' on curve 90 at which point relay 47 opens, causing rotation of motor 35 and adjustment of resistor 34 to be stopped. The unshunting process continues in a plurality of small steps between points 84' and 85' until a condition of minimum shunting is achieved and motor 29 once again operates along curve 88 of Fig. 6.

It should be understood that for the sake of simplicity only a relatively few steps of shunting and unshunting are represented in Fig. 6, while in actual practice the number of such steps will be relatively large. Furthermore, the current differentials causing shunting and unshunting to be initiated and stopped are shown exaggerated in magnitude for greater clarity. In actual practice, these values are made relatively small so that the actual deviation in current value from the desired current value at the point of maximum utilization, as represented by point 80 in Fig. 5 and Fig. 5a, is exceedingly small. In other words, the regulation of generator current at a point of maximum utilization is accomplished by our invention in a plurality of relatively small steps which maintain the actual current at all times within a relatively narrow band in the region of the desired value. If, on the other hand, shunting or unshunting were accomplished in a single step, considerable upset would result to the system and the shunting operations would not be carried out in a smooth manner, and the current to be regulated would at times vary considerably from the desired value.

While in the embodiment of our invention as set forth above only a single motor, designated by numeral 29, has been shown in order to simplify the drawings and explanation as previously mentioned, it will be understood that a plurality of such motors each including a field member, such as field 32, may be and usually is employed in applications of systems of the type described, such as, for example, the power system of a Diesel-electric locomotive. Such a plurality of motors may be variously arranged in series, series-parallel, or parallel combinations across the terminals of a generator component, such as generator 28, in accordance with the speed and torque requirements of a driven load, such as load 30. It will be further understood that, in accordance with our invention, in a system including a plurality of motors, a plurality of associated field-shunting resistors is provided, while the current-measuring signal may be derived from a common current-measuring device such as shunt 31, said signal being utilized by a common associated control circuit of the type represented in Fig. 3 and previously described.

It will also be understood that while we have shown in the embodiment of our invention a motor of the type having a field exciting winding connected in series relation with the armature thereof, commonly referred to as a "series motor," our invention is in no way restricted to motors of this type and may equally well be employed in connection with motors of the type having field exciting windings connected in parallel relation with the armatures thereof or having separately energized field exciting windings, such motors being commonly referred to as "shunt motors."

While we have shown and described our invention as applied to a particular system of connections and as embodying various devices diagrammatically shown, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States is:

1. In an electric power system, the combination of an electric generator, an electric motor having an armature winding and a field exciting winding, said armature winding being connected to said generator, means to measure current supplied to said armature winding by said generator, a pair of amplifying devices each having an input circuit arranged to be energized responsive to the flow of said current, means responsive to the power output of said amplifiers to vary the excitation of said field exciting winding, one of said amplifiers being connected to increase said excitation responsive to said current, the other of said amplifiers being connected to decrease said excitation responsive to said current.

2. In an electric power system, the combination of an electric generator, an electric motor having an armature winding and a field exciting winding, said armature winding being adapted to be energized by said generator, means to measure the current supplied to said armature winding by said generator, adjustable means to vary the excitation of said field exciting winding, a pair of amplifying devices, each having an input circuit arranged to be energized responsive to the flow of said current, one of said amplifying devices having an output circuit arranged to vary said adjustable means to initiate a decrease of excitation of said field exciting winding in response to one of a first pair of predetermined values of said current and to arrest said decrease in response to the other of said first pair of predetermined values, the other of said amplifying devices having an output circuit arranged to vary said adjustable means to initiate an increase of excitation of said field exciting winding in response to one of a second pair of predetermined values of said current and to arrest said increase in response to the other of said second pair of predetermined values.

3. In an electric power system, the combination of an electric generator, an electric motor having an armature winding and a field exciting winding, said armature winding being arranged to be energized by said generator, a current-measuring device arranged to measure the current supplied to said armature winding, an adjustable resistance connected in parallel relation with said field exciting winding, reversible means to vary said adjustable resistance, means comprising a pair of amplifying devices arranged to utilize a signal from said measuring device to control said reversible means, each of said amplifying devices comprising an input circuit, a bias circuit, a feed-back circuit, and an output circuit, means for supplying unidirectional potential to said bias circuit to control the operating characteristic of said amplifying device, a load impedance connected in said output circuit, said feed-back circuit comprising a resistor connected across said load impedance, and means utilizing a portion of the voltage across said resistor to modify the voltage developed across said load impedance, said input circuit being connected across said current-measuring device, each of said output circuits including a relay, one of said relays being arranged to control said reversible means to vary said adjustable resistor to initiate a decrease of excitation of said field exciting winding in response to one of a first pair of predetermined values of said current and to arrest said decrease of excitation in response to the other of said first pair of predetermined values, the other of said relays being arranged to control said reversible means to vary said adjustable resistor to initiate an increase of excitation of said field exciting winding in response to one of a second pair of predetermined values of said current and to arrest said increase of excitation in response to the other of said second pair of predetermined values.

4. In an electric power system, the combination of an electric motor having an armature winding and a field exciting winding, means for energizing said armature winding, means to measure the current supplied to said armature winding, adjustable means to vary the excitation of said field exciting winding, a pair of amplifying devices, each having an input circuit arranged to be energized responsive to the flow of said current, one of said amplifying devices having an output circuit arranged to vary said adjustable means to initiate a decrese of excitation of said field exciting winding in response to the lower of a first pair of predetermined values of said current, and to arrest said decrease in response to the higher of said first pair of predetermined values, the other of said amplifying devices having an output circuit arranged to vary said adjustable means to initiate an increase of excitation of said field exciting winding in response to the higher of a second pair of predetermined values of said current and to arrest said increase in response to the lower of said second pair of predetermined values, said lower value of said second pair being higher than said higher value of said first pair.

MARTIN A. EDWARDS.
CHARLES F. BAUERSFELD.

REFERENCES CITED

The following references are of record in the file of this patent:

UNITED STATES PATENTS

| Number | Name | Date |
|---|---|---|
| 1,698,288 | Winne | Jan. 8, 1929 |
| 1,801,657 | Buyko | Apr. 21, 1931 |